(12) United States Patent
Wu et al.

(10) Patent No.: US 7,802,921 B2
(45) Date of Patent: Sep. 28, 2010

(54) SLIDING-ASSISTANCE UNIT FOR A LINEAR MOTION APPARATUS

(75) Inventors: Ching-Shan Wu, Taichung Hsien (TW); Meng-Yi Chen, Taichung Hsien (TW); Jen-Wen Chen, Taichung (TW)

(73) Assignee: Precision Motion Industries, Inc., Taichung Hsien (TW)

( * ) Notice: Subject to any disclaimer, the term of this patent is extended or adjusted under 35 U.S.C. 154(b) by 422 days.

(21) Appl. No.: 12/075,345

(22) Filed: Mar. 11, 2008

(65) Prior Publication Data

US 2009/0232427 A1    Sep. 17, 2009

(51) Int. Cl.
    *F16C 29/06* (2006.01)
(52) U.S. Cl. .......................................... 384/44
(58) Field of Classification Search .............. 384/43–45
    See application file for complete search history.

(56) References Cited

U.S. PATENT DOCUMENTS

| | | | | |
|---|---|---|---|---|
| 5,129,736 | A * | 7/1992 | Tanaka | 384/45 |
| 6,729,760 | B2 * | 5/2004 | Mochizuki et al. | 384/45 |
| 2005/0281497 | A1 * | 12/2005 | Akiyama et al. | 384/44 |
| 2006/0072862 | A1 * | 4/2006 | Scotte et al. | 384/44 |
| 2007/0147713 | A1 * | 6/2007 | Kato et al. | 384/44 |

\* cited by examiner

*Primary Examiner*—Thomas R Hannon
(74) *Attorney, Agent, or Firm*—William E. Pelton, Esq.; Cooper & Dunham LLP

(57) ABSTRACT

A linear motion apparatus has a linear track, a slider and two sliding-assistant units for a linear motion apparatus. The sliding-assistant units for a linear motion apparatus is mounted between the track and the slider to enhance ease of movement between the track and the slider, and each sliding-assistant unit has two roller rings to receive rollers. The roller rings are elongated rectangular rings, are selectively mounted oppositely crossly around each other. Each roller ring is designed with reduced components to make manufacturing and assembling the sliding-assistant unit easier. Moreover, the roller ring is designed as one unity so no seam will be formed due to assembling two different pieces, such that ensures contact between the rollers and the roller ring smooth.

6 Claims, 9 Drawing Sheets

SLIDING-ASSISTANCE UNIT FOR A LINEAR MOTION APPARATUS

BACKGROUND OF THE INVENTION

1. Field of Invention

The present invention relates to a sliding-assistant unit, and more particularly to a sliding-assistant unit for a linear motion apparatus.

2. Description of the Related Art

A sliding-assistant unit is applied between a slider and a linear track of a linear motion apparatus to help the slider sliding along the linear track for transferring things and reducing noise and friction during the linear motion apparatus being operated.

A conventional sliding-assistant unit as shown in FIG. 1 of U.S. Pat. No. 6,729,760B2 is applied on a slider (2) to help the slider to move along a track (1). However, components of the conventional sliding-assistant unit are complicated. Additionally, each component of the conventional sliding-assistant unit is different to others, such that the assembling and manufacturing of the conventional sliding-assistant unit are difficult and complicated.

Another conventional sliding-assistant unit disclosed in US publication 2006/0072862 is mounted on a slider (20) and includes four U-shaped roller rings (30) to receive multiple rollers (51) inside with each roller (51) being partially exposed out to contact a track (10). Although components of the conventional sliding-assistant unit are much simplified, but each U-shaped roller ring (30) is assembled by two half shells as shown in FIGS. 3 to 5. Thus, a seam will be formed between the two half shells and then causes non-smoothness of an inner surface of the roller ring (30). Consequently, friction between the roller ring (30) and the rollers (51) will be further increased due to non-smoothness of the inner surface of the roller ring (30).

To overcome the shortcomings, the present invention provides a sliding-assistant unit for a linear motion apparatus to mitigate or obviate the aforementioned problems.

SUMMARY OF THE INVENTION

The primary objective of the present invention is to provide a sliding-assistant unit for a linear motion apparatus, which has simplified structures and is formed as one unity.

A linear motion apparatus has a linear track, a slider and two sliding-assistant units for a linear motion apparatus. The sliding-assistant units for a linear motion apparatus are mounted between the track and the slider to enhance ease of movement between the track and the slider, and each sliding-assistant unit has two roller rings. The roller rings are elongated rectangular rings, are selectively mounted oppositely crossly around each other. Each roller ring is designed with reduced components to make manufacturing and assembling the sliding-assistant unit easier. Moreover, the roller ring is designed as one unity so no seam will be formed due to assembling two different pieces, such that ensures contact between the rollers and the roller ring smooth.

Other objectives, advantages and novel features of the invention will become more apparent from the following detailed description when taken in conjunction with the accompanying drawings.

DETAILED DESCRIPTION OF THE INVENTION

Figure 1:
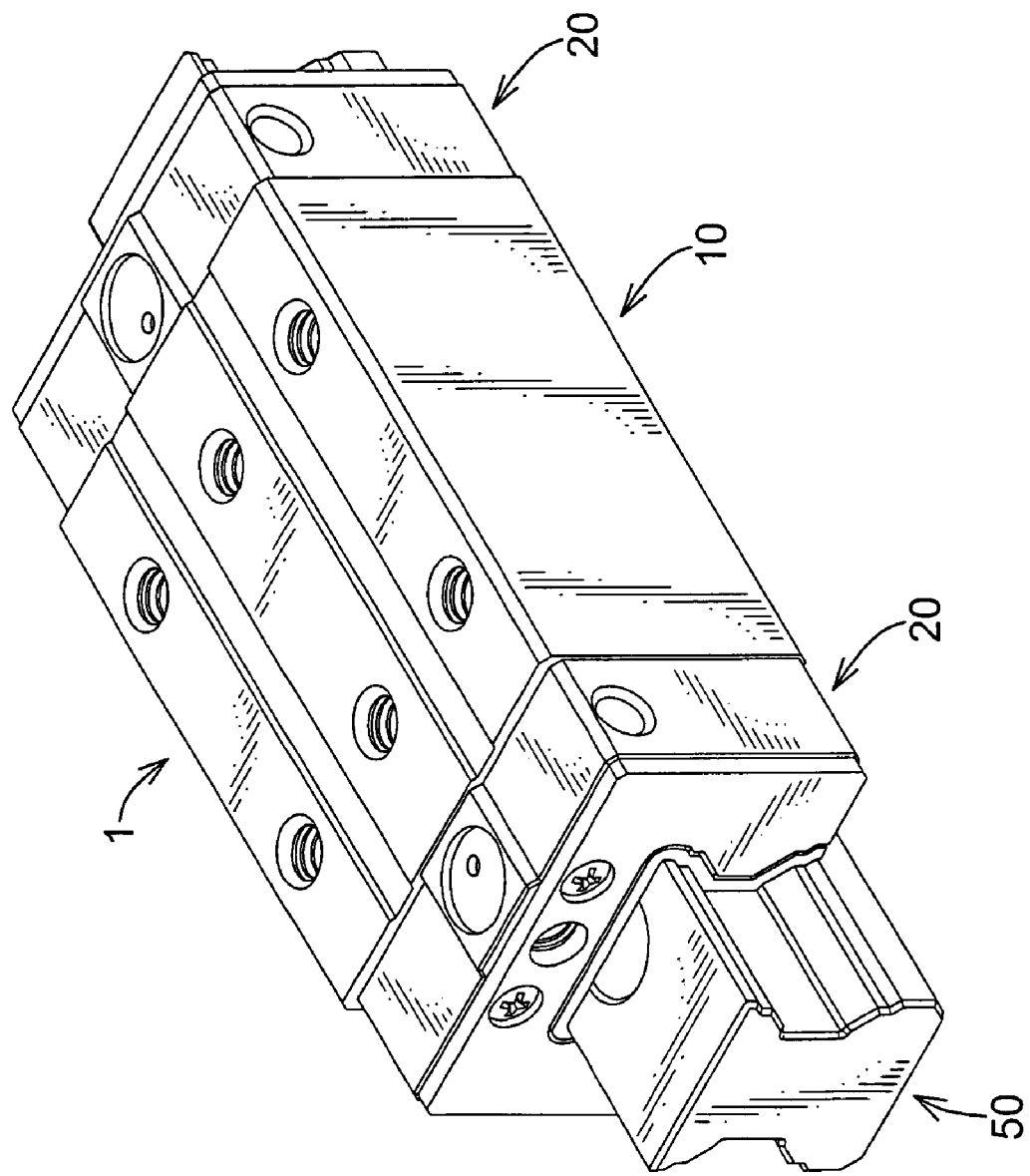
FIG. 1 is a perspective view of a linear motion apparatus.
Figure 2:
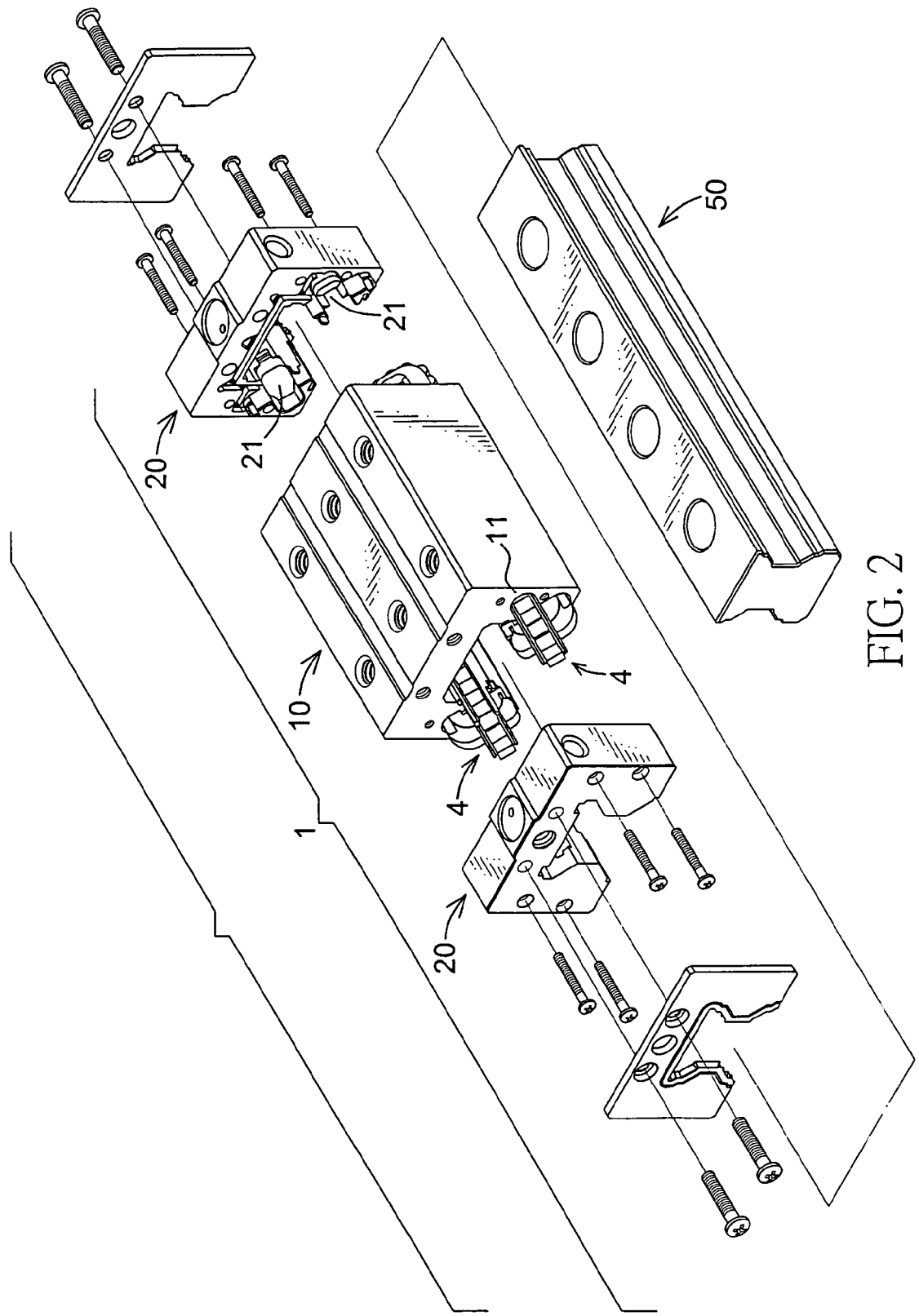
FIG. 2 is an exploded perspective view of the linear motion apparatus in FIG. 1.
Figure 3:
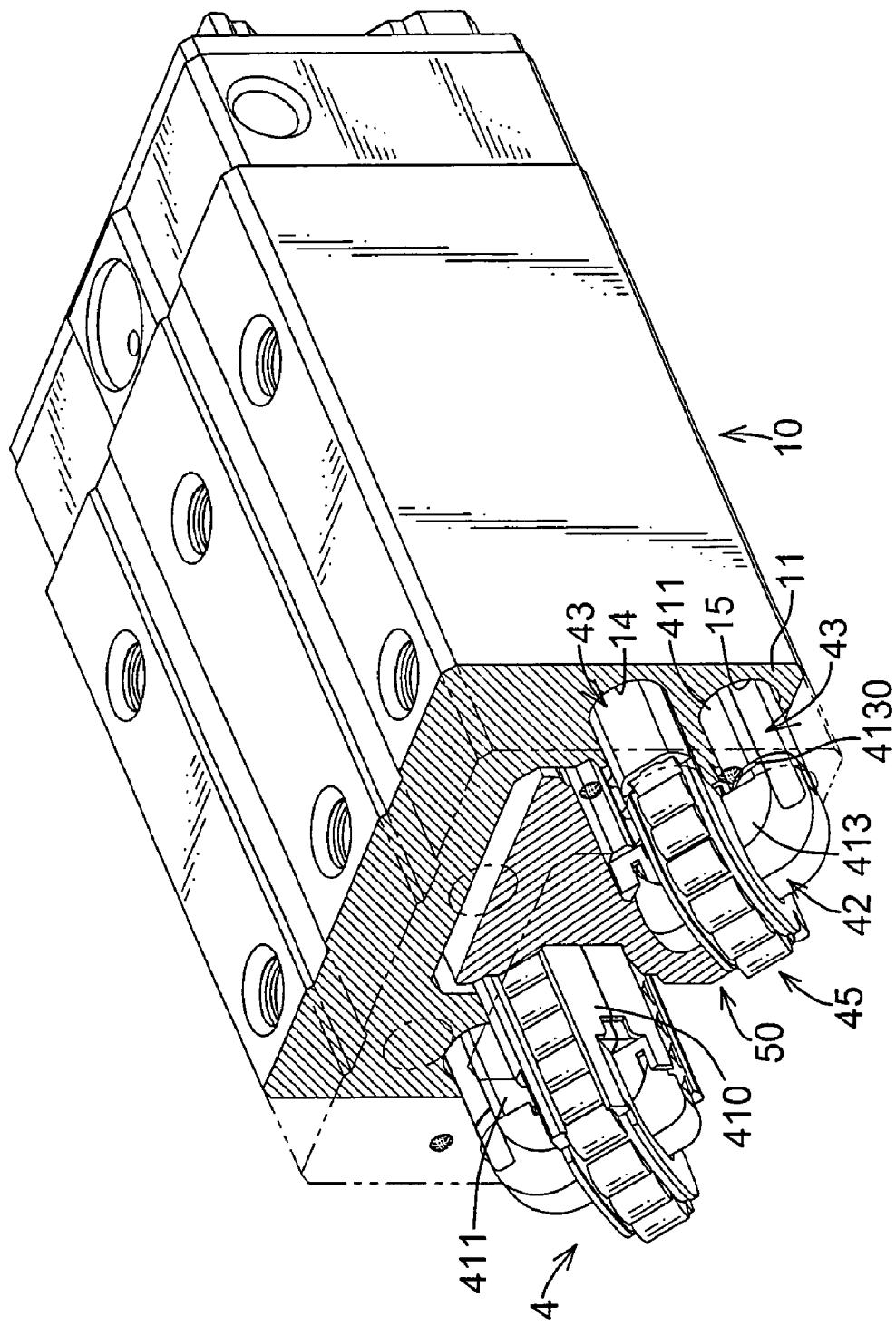
FIG. 3 is a perspective view in partial section of the linear motion apparatus in FIG. 1 with a sliding-assistant unit for a linear motion apparatus in accordance with the present invention.

With reference to FIGS. 1 to 3, a linear motion apparatus comprises a linear track (50), a slider (1) and two sliding-assistant units (4) in accordance with the present invention.

Figure 4:
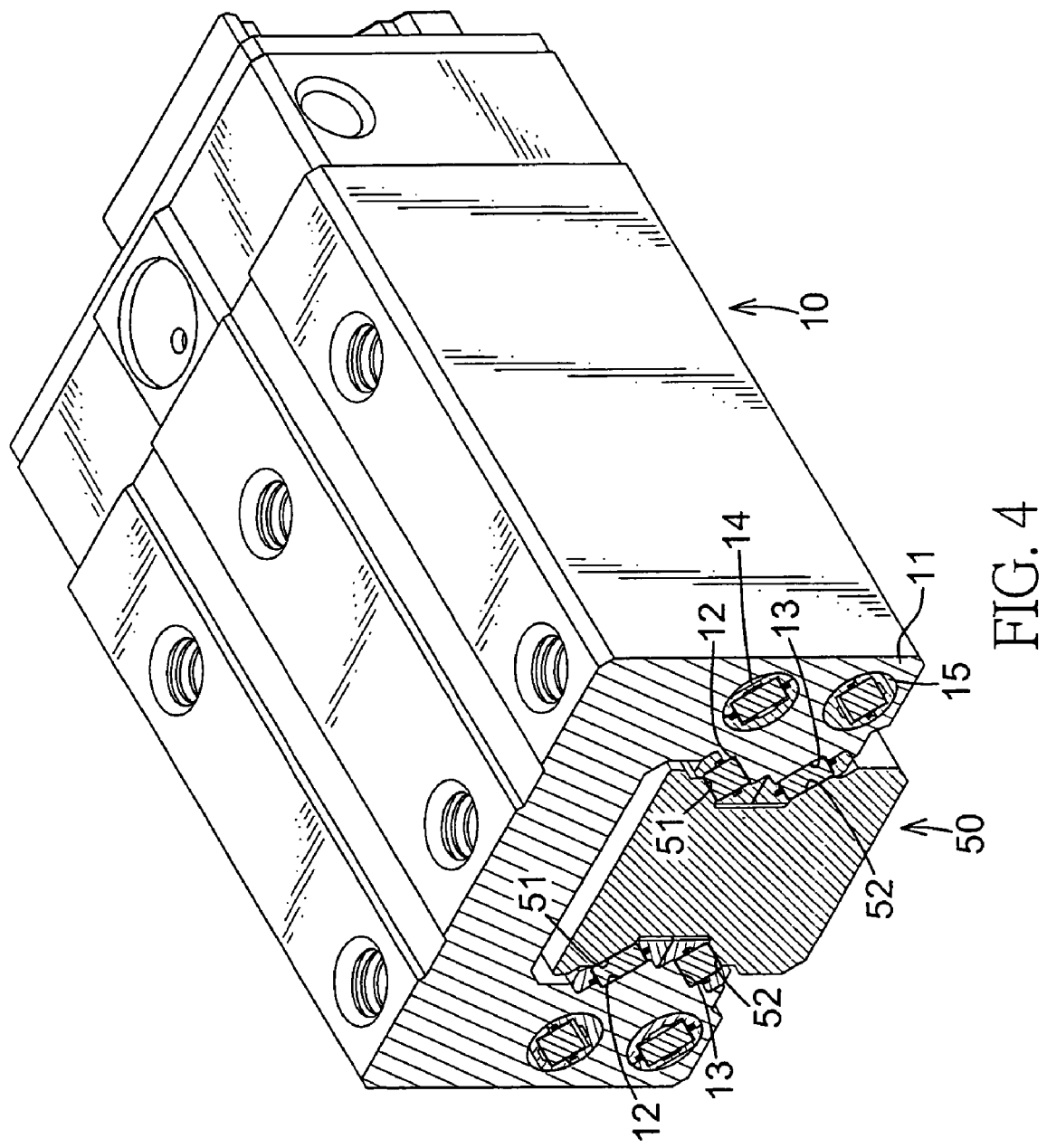
FIG. 4 is a perspective view in partial section of the linear motion apparatus in FIG. 1.
Figure 5:
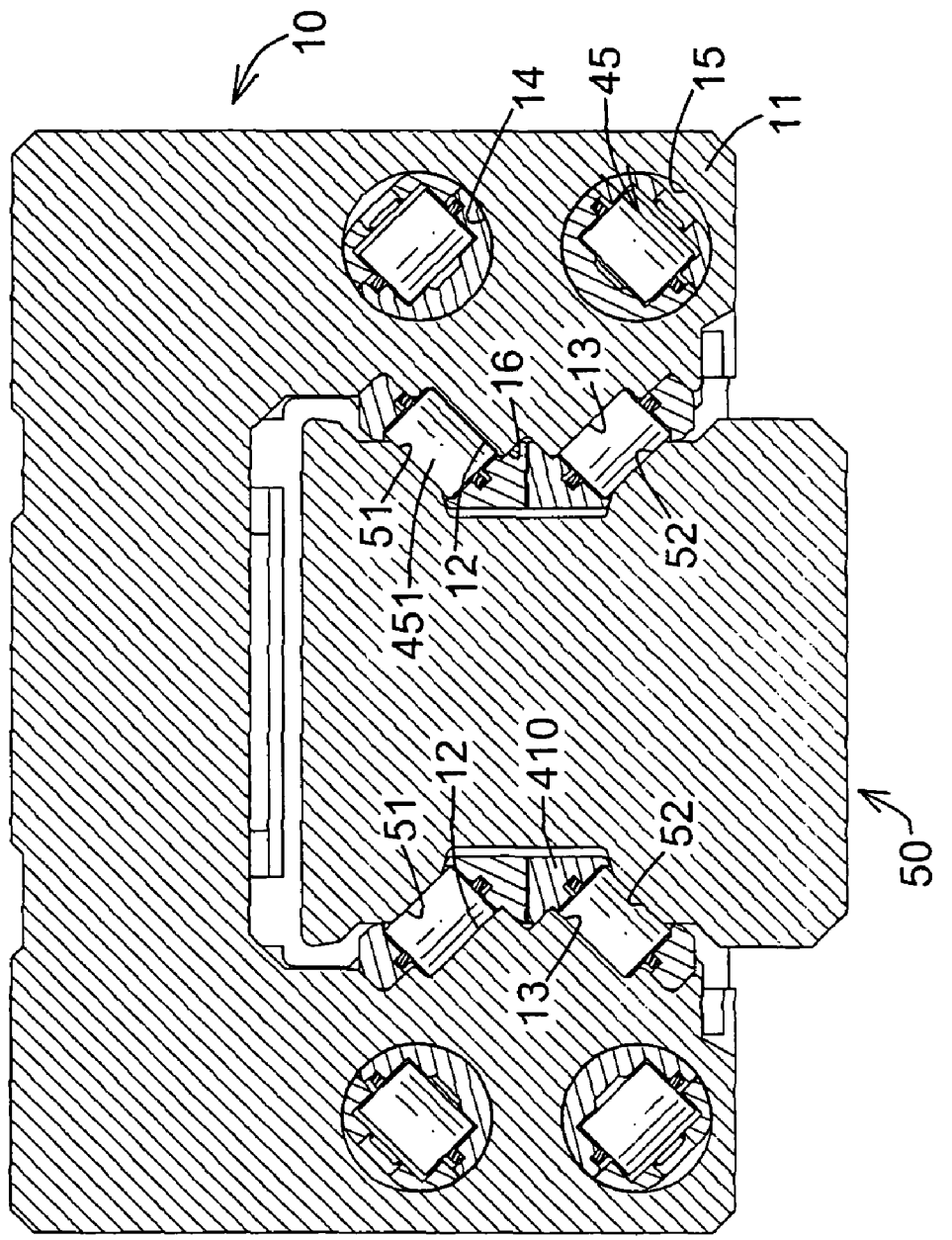
FIG. 5 is a front view in partial section of the linear motion apparatus in FIG. 1.

With further reference to FIGS. 4 and 5, the track (50) is elongated and has two ends, an inner segment, a middle segment, an outer segment, an inner track protrusion, an outer track protrusion, two inner guiding paths (51) and two outer guiding paths (52).

The inner track protrusion is formed on and protrudes oppositely away from the inner segment of the track (50) and forms two opposite inclined edges between the inner segment and the middle segment.

The outer track protrusion is formed on and protrudes oppositely away from the outer segment of the track (50) and forms two opposite inclined edges between the outer segment and the middle segment.

The inner guiding paths (51) are straight and are respectively formed on the inclined edges of the inner track protrusion between the ends of the track (50).

The outer guiding paths (52) are straight and are respectively formed on the inclined edges of the outer track protrusion between the ends of the track (50).

The slider (1) is mounted slidably on the track (50) and has a sliding body (10) and two end caps (20).

The sliding body (10) is mounted slidably around the inner track protrusion of the track (50) and has an inner surface, two ends, two sides and two clamping walls (11).

The inner surface of the sliding body (10) corresponds to the inner segment of the track (50).

The clamping walls (11) are respectively formed on and protrudes from the inner surface of the sliding body (10) at the sides between the ends, are parallel to each other and together clamp the track (50). Each clamping wall (11) has an inner surface, a path protrusion, a first mounting hole (14) and a second mounting hole (15).

The path protrusion of each clamping wall (11) is formed on and protrudes from the inner surface of the clamping wall (11) between the ends of the sliding body (10), correspondingly face towards the middle segment of the track (50), is inclined symmetrically in transverse cross-section to form an inner path (12) and an outer path (13) and may have a hooking groove (16).

The inner path (12) of the path protrusion of each clamping wall (11) corresponds to and is parallel with the corresponding inner guiding path (51).

The outer path (13) of the path protrusion of each clamping wall (11) corresponds to and is parallel with the corresponding outer guiding path (52).

The hooking groove (16) is formed in the path protrusion between to the inner path (12) and the outer path (13).

The first mounting hole (14) of each clamping wall (11) is round in cross-section, is formed longitudinally through the clamping wall (11) and corresponds to and is parallel with the outer path (13) and the corresponding outer guiding path (52).

The second mounting hole (15) of each clamping wall (11) is round in cross-section, is formed longitudinally through the clamping wall (11) and corresponds to and is parallel with the inner path (12) and the corresponding inner guiding path (51).

The end caps (20) are mounted respectively on the ends of the sliding body (10) and each end cap (20) has two mounting recesses (21).

Each mounting recess (21) is formed in the end cap (20), may be formed as two elongated slots that cross each other and corresponds to and aligns with the inner path (12), the outer path (13), the first mounting hole (14) and the second mounting hole (15) of the corresponding clamping wall (11) and the corresponding inner guiding path (51) and outer guiding path (52).

Figure 6:
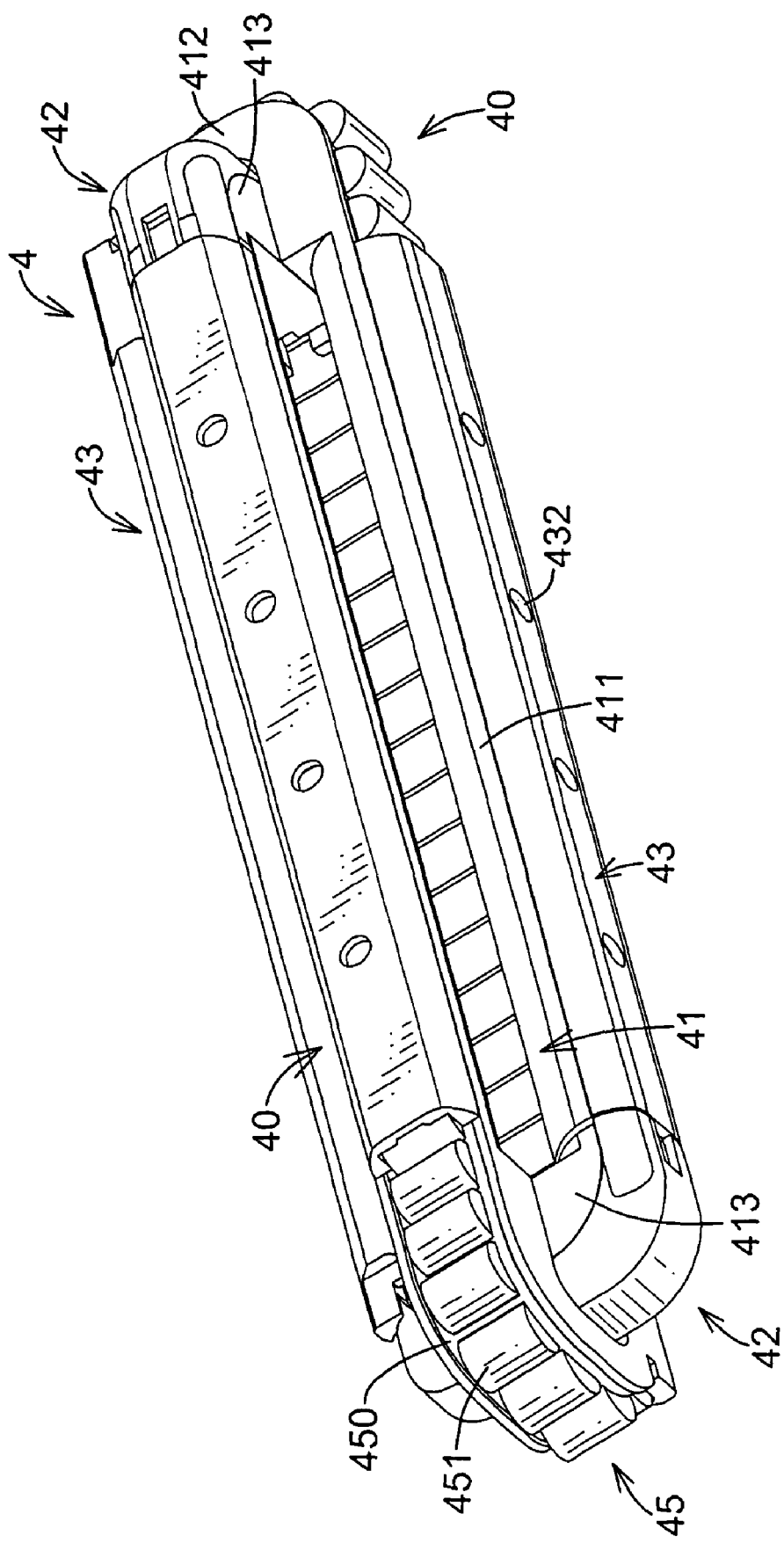
FIG. 6 is a perspective view of a sliding-assistant unit for a linear motion apparatus in FIG. 3.
Figure 7:
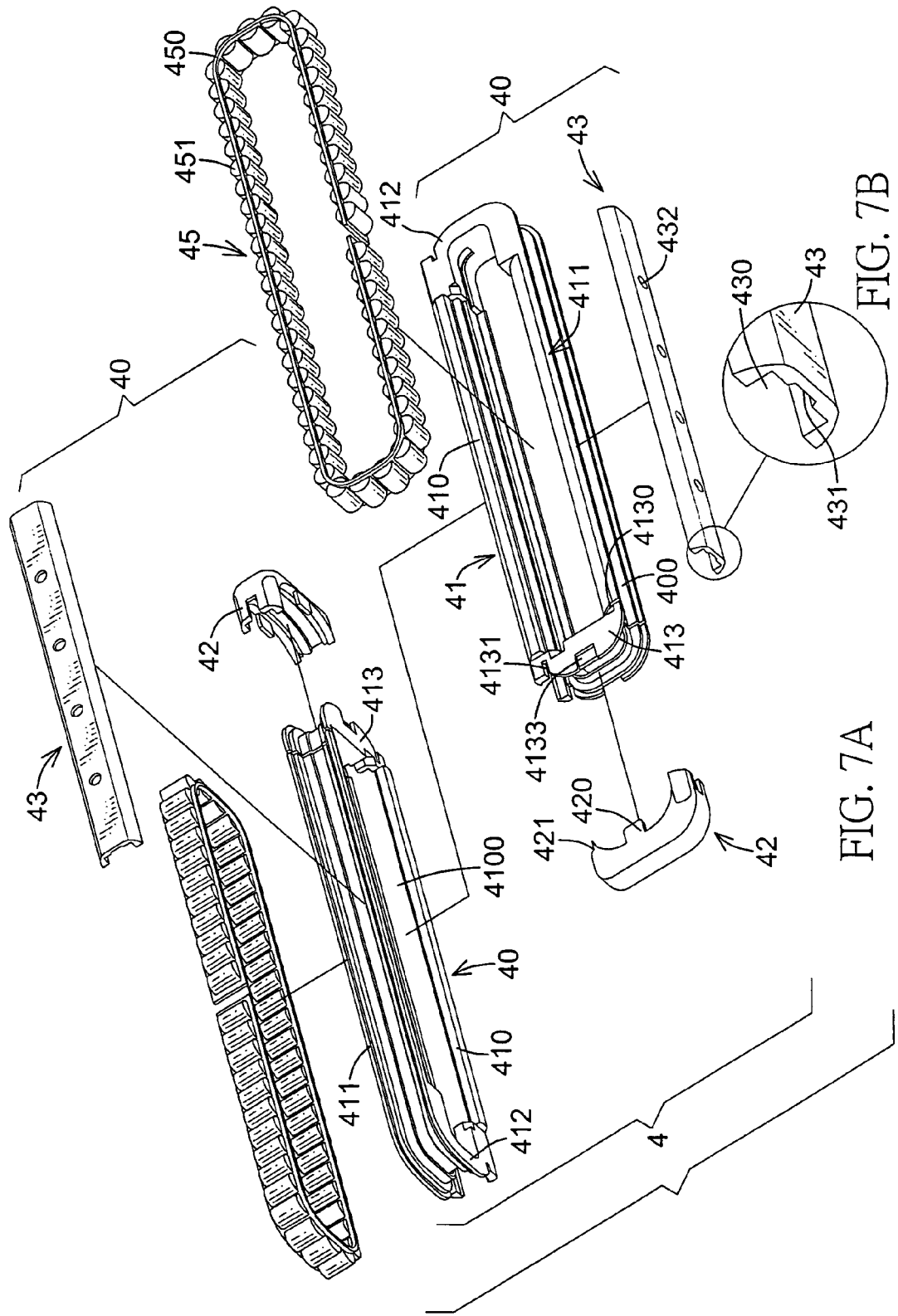
FIG. 7A is an exploded perspective view of the sliding-assistant unit for a linear motion apparatus in FIG. 3.
FIG. 7B is a partial enlarged perspective view of the sliding-assistant unit for a linear motion apparatus in FIG. 3.

With further reference to FIGS. 6, 7A and 7B, the sliding-assistant units (4) for a linear motion apparatus in accordance with the present invention is mounted between the track (50) and the slider (1) and each sliding-assistant unit (4) comprises two roller rings (40).

The roller rings (40) are selectively mounted oppositely crossly around each other and each roller ring (40) has a frame (41), a roller assembly (45), a head cover (42) and a side cover (43).

The frame (41) of each roller ring (40) is an elongated rectangular ring, is resilient and has an elongated hole, a sliding-assistance bar (410), a mounting bar (411), an exposing bridge (412), a mounting head (413), a roller groove (400), a gap (4130) and two limiting protrusions (4102).

The elongated hole is formed through the frame (41).

Figure 8:
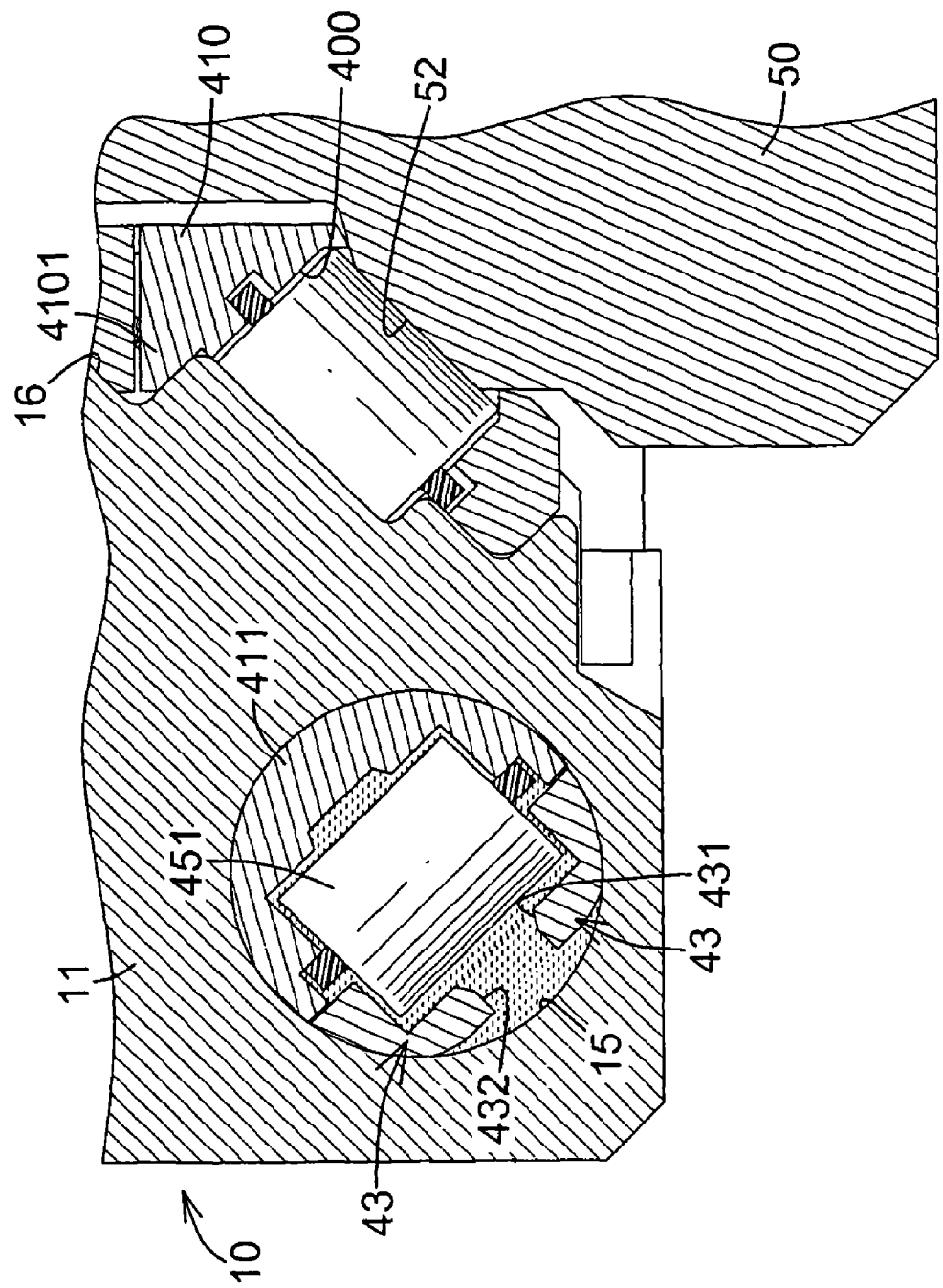
FIG. 8 is an enlarged partial front view in partial section of the linear motion apparatus in FIG. 1.

With further reference to FIG. 8, the sliding-assistance bar (410) of one of the roller rings (40) corresponds to and is selectively mounted between the corresponding inner guiding path (51) and the corresponding inner path (12). The sliding-assistance bar (410) of the other roller ring (40) corresponds to and is selectively mounted between the corresponding outer guiding path (52) and the corresponding outer path (13). The sliding-assistance bar (410) has an inner side, an elongated opening (4100) and an optional hook protrusion (4101). The elongated opening (4100) is formed through the sliding-assistance bar (410). The hook protrusion (4101) is formed on and protrudes inwardly from the inner side of the sliding-assistance bar (410) and corresponds to and selectively engages the hooking groove (16) to further hold the sliding-assistance bar (410) in position.

The mounting bar (411) is parallel with the sliding-assistance bar (410) and corresponds to and is selectively mounted through one first mounting hole (14) or one second mounting hole (15).

The exposing bridge (412) connects between the sliding-assistance bar (410) and the mounting bar (411) and cooperates with the sliding-assistance bar (410) and the mounting bar (411) to form a U-shaped mount. The U-shaped mount has a width. The width corresponding to a thickness of the frame (41).

The mounting head (413) is parallel with the exposing bridge (412), protrudes from the sliding-assistance bar (410) and corresponds to the mounting bar (411) and has two opposite outside surfaces, a proximal end, a heading edge, two mounting recesses (4133) and a mounting slot (4131).

The mounting recesses (4133) are respectively formed in the opposite outside surfaces of the mounting head (413) adjacent to the heading edge.

The mounting slot (4131) is formed in the proximal end of the mounting head (413) from the heading edge.

The gap (4130) is formed between the mounting head (413) and the mounting bar (411). Therefore, an user can bend the mounting bar (411) outward to enlarge the gap (4130) first then mount the mounting bar (411) through the first hole (14) or the second hole (15) while assembling, also two frames (41) are able to be mounted around each other due to the gap (4130).

Figure 9:
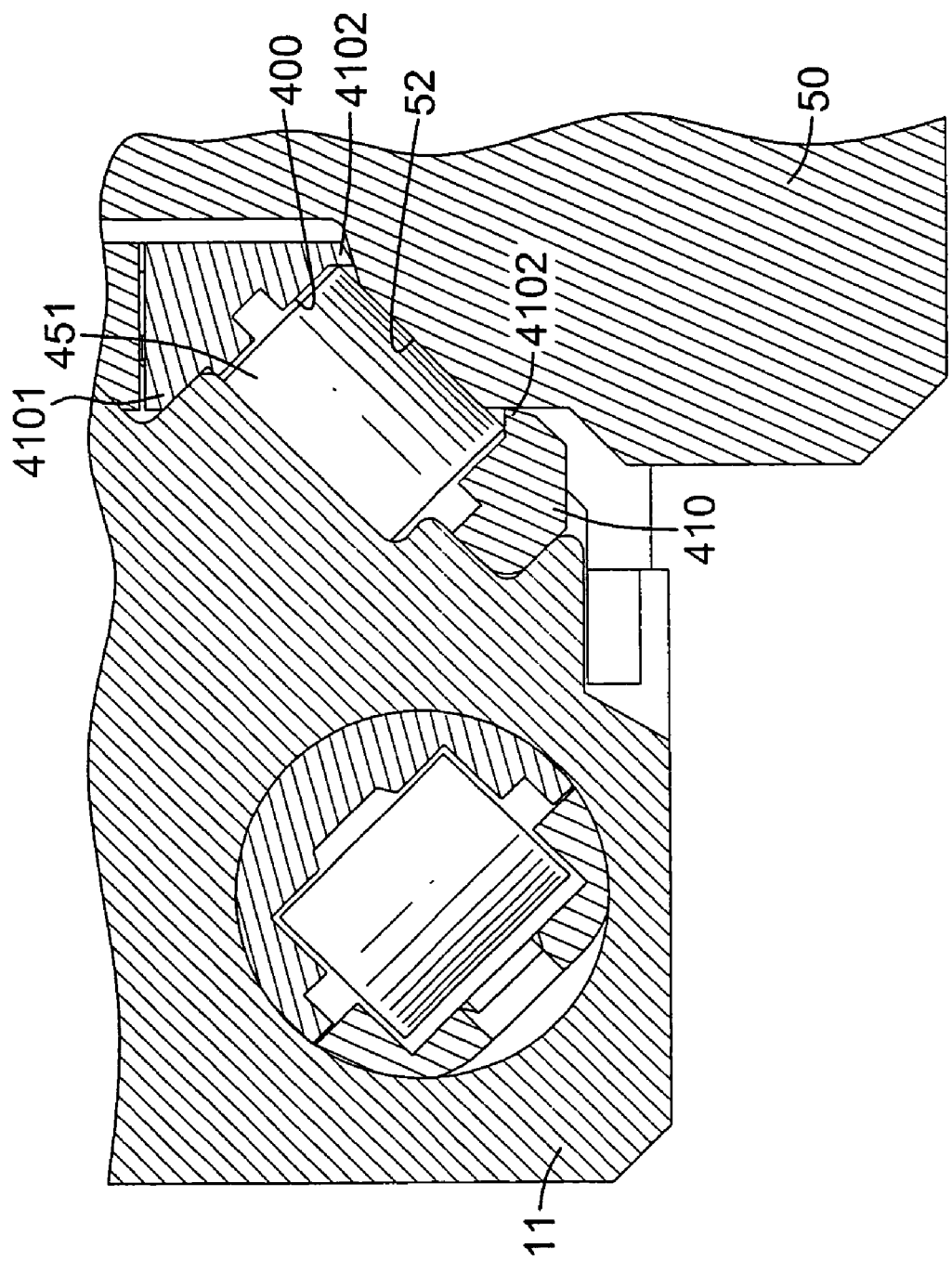
FIG. 9 is another enlarged partial front view in partial section of the linear motion apparatus in FIG. 1.

With further reference to FIG. 9, the roller groove (400) is formed in and around the frame (41) and has an opening.

The limiting protrusions (4102) are oppositely formed in the sliding-assistance bar (410) to prevent the rollers (451) from falling off.

The roller assemblies (45) of the sliding-assistant unit (4) are respectively mounted in the roller grooves (400) of the frames (41) of the sliding-assistant unit (4) and each has a resilient belt (450) and multiple rollers (451).

The rollers (451) are cylinders, are parallelly mounted rollably in a column along the resilient belt (450), are mounted rollably in the roller groove (400) of the frame (41) and are partially exposed out from the roller groove (400) and the elongated opening in the sliding-assistance bar (410) to touch and roll between the inner guiding path (51) and the inner path (12) or the outer guiding path (52) and outer path (13) to reduce friction of movement between the slider (1) and the track (50).

The head cover (42) is mounted detachably on the mounting head (413) to prevent the roller assembly (45) from falling off, corresponds to and is selectively mounted in the U-shaped mount of the frame (41) and has an end, two tabs (420) and an engager (421).

The two tabs (420) are formed on and protrude from the head cover (42) and correspond to and selectively engage the mounting recesses (4133) to hold the head cover (42) on the mounting head (413).

The engager (421) is formed on and protrudes from the head cover (42) and corresponds to and selectively engages the mounting slot (4131) to hold the head cover (42) on the mounting head (413).

The side cover (43) is elongated, is mounted detachably on the mounting bar (411) to prevent the roller assembly (45) from falling off and has an inner surface, an outer surface, two outer side-edges, a receiving groove (430), an oil groove (431) and multiple oil holes (432).

The outer surface is flat and distances from an inner surface of one first mounting hole (14) or one second mounting hole (15) when the mounting bar (411) is mounted in the first mounting hole (14) or the second mounting hole (15) such that allows lubricant to be added into the first mounting hole (14) or the second mounting hole (15).

The outer side-edges are oppositely adjacent to the outer surface, are curved and selectively abut to and fit the inner surface of one first mounting hole (14) or one second mounting hole (15) so presses the side cover (43) securely on the mounting bar (411).

The receiving groove (430) is formed in the inner surface of the side cover (43) to receive the roller assembly (45) and has a bottom.

The oil groove (431) is formed in the bottom of the receiving groove (430).

The oil holes (432) are formed through the side cover (43) and communicate with the oil groove (431) to allow lubricant to be added on the roller assembly (45) when the mounting bar (411) is mounted in the first mounting hole (14) or the second mounting hole (15).

Consequently, components of the sliding-assistant unit (4) are much simplified such that manufacturing and assembling of the sliding-assistant unit (4) becomes much easier. In addition, because there is no seam that will be formed on surface of the roller groove (400), so contact between the roller groove (400) and the rollers (451) will be smooth. Even though the gap (4130) is formed on the frame (41) for assembling the sliding-assistant unit (4), but continuing surface of the roller groove (400) at the gap (4130) is kept flat after assembling so will not generate negative influence to the smoothness of the contact.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A sliding-assistant unit for a linear motion apparatus comprising:
    two roller rings being selectively mounted oppositely crossly around each other and each roller ring having
        a frame being an elongated ring, being resilient and having
            an elongated hole being formed through the frame;
            a sliding-assistance bar having
                an inner side; and
                an elongated opening being formed through the sliding-assistance bar;
            a mounting bar being parallel with the sliding-assistance bar;
            an exposing bridge connecting between the sliding-assistance bar and the mounting bar and cooperating with the sliding-assistance bar and the mounting bar to form a U-shaped mount having a width corresponding to a thickness of the frame; and
            a mounting head being parallel with the exposing bridge, protruding from the sliding-assistance bar and corresponding to the mounting bar and having two opposite outside surfaces;
                a proximal end; and
                a heading edge;
            a gap being formed between the mounting head and the mounting bar; and
            a roller groove being formed in and around the frame and having an opening;
        a head cover being mounted detachably on the mounting head, corresponding to and being selectively mounted in the U-shaped mount of the frame and having an end; and
        a side cover being elongated, being mounted detachably on the mounting bar and having
            an inner surface;
            an outer surface; and
            a receiving groove being formed in the inner surface of the side cover and having a bottom.

2. The sliding-assistant unit for a linear motion apparatus as claimed in claim 1, wherein the side cover of each roller ring further has an oil groove being formed in the bottom of a corresponding receiving groove.

3. The sliding-assistant unit for a linear motion apparatus as claimed in claim 2, wherein
    the outer surface of the side cover of each roller ring is flat; and
    the side cover of each roller ring further has multiple oil holes being formed through the side cover and communicating with the corresponding oil groove.

4. The sliding-assistant unit for a linear motion apparatus as claimed in claim 1, wherein the frame of each roller ring further has two limiting protrusions being oppositely formed in the sliding-assistance bar.

5. The sliding-assistant unit for a linear motion apparatus as claimed in claim 1, wherein the sliding-assistance bar of each roller ring further has a hook protrusion being formed on and protruding inwardly from the inner side of a corresponding sliding-assistance bar.

6. The sliding-assistant unit for a linear motion apparatus as claimed in claim 1, wherein
    the mounting head of the frame of each roller ring further has
        two mounting recesses being respectively formed in the opposite outside surfaces of the mounting head adjacent to the heading edge; and
        a mounting slot being formed in the proximal end of the mounting head from the heading edge;
    the head cover of each roller ring further has
        two tabs being formed on and protruding from the head cover and corresponding to and selectively engaging the mounting recesses of a corresponding mounting head; and
        an engager being formed on and protruding from the head cover and corresponding to and selectively engaging the mounting slot of the corresponding mounting head.

* * * * *